Jan. 10, 1939.　　　F. L. O. WADSWORTH　　　2,143,096
APPARATUS FOR SEVERING MOLTEN GLASS
Original Filed March 21, 1934　　　2 Sheets-Sheet 1

INVENTOR
Frank L. O. Wadsworth
By Green & McCallister
His Attorneys

Jan. 10, 1939. F. L. O. WADSWORTH 2,143,096
APPARATUS FOR SEVERING MOLTEN GLASS
Original Filed March 21, 1934 2 Sheets-Sheet 2

INVENTOR
Frank L. O. Wadsworth
By Green & McCallister
His Attorneys

Patented Jan. 10, 1939

2,143,096

UNITED STATES PATENT OFFICE 2,143,096

APPARATUS FOR SEVERING MOLTEN GLASS

Frank L. O. Wadsworth, Pittsburgh, Pa., assignor to Ball Brothers Company, Muncie, Ind., a corporation of Indiana Original application March 21, 1934, Serial No. 716,627. Divided and this application June 24, 1935, Serial No. 28,097. Renewed January 5, 1938

25 Claims. (Cl. 49—14)

This invention relates to an improved mechanism for severing a suspended and preshaped stream of molten glass to form individual gobs or mold charges, and is a division of my copending application Serial No. 716,627, filed March 21, 1934.

The primary object of the present invention is to provide a high speed shear or severing mechanism which will effect a proper cutting off of the preshaped stream sections at the desired intervals with the minimum disturbance or distortion of the surface contour of the flowing material and with the minimum chilling of the portions of the stream engaged by the severing elements.

Another object is to provide a mechanism which will effect the severance of the suspended stream of molten material by a concurrent transverse and axial movement of the severing elements and thus avoid any tendency to interrupt or retard the free downward flow of the material and also prevent any piling up of molten material on the severing elements and the consequent chilling and distortion of the severed stub.

A further object is to provide a shear mechanism for severing a suspended stream of molten glass into individual mold charges in which the shear elements not only rotate about the stream during the severing operation, but also travel through a three-dimensional spiral path as they pass into and through the stream.

These and other objects which will be hereinafter made apparent to those skilled in this particular art are accomplished by means of this invention, one embodiment of which is illustrated in the accompanying drawings, wherein:

Fig. 3 is an enlarged view illustrating a detail of the mechanism controlling the rotation of the shears;

Figure 1:
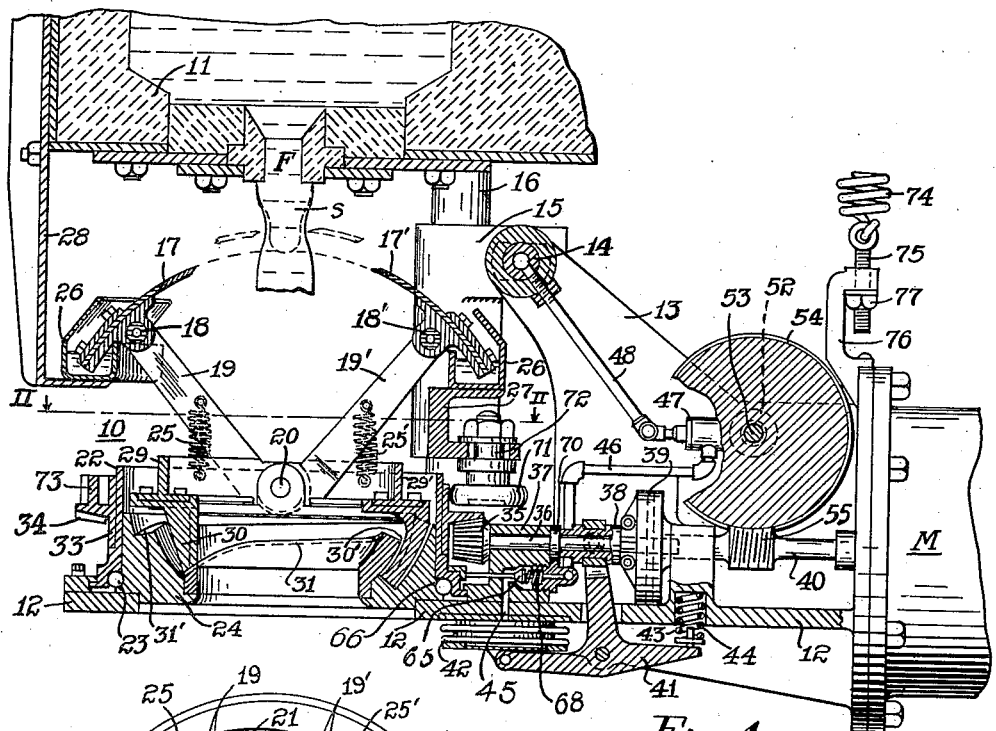
Figure 1 is a view in vertical section of my improved shear mechanism for severing a continuously flowing and preshaped stream of molten glass into individual gobs or mold charges.
Figure 2:
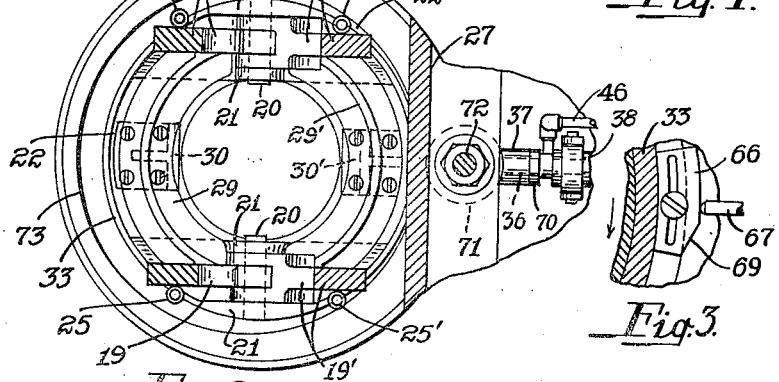
Fig. 2 is a horizontal section taken on line II—II of Fig. 1.

Referring to the drawings, I have illustrated my improved high speed shear mechanism (designated in its entirety as 10) in connection with a forehearth or flow spout 11 having an orifice F in the bottom thereof through which the molten glass to be severed is issuing in a continuous but pulsating stream S. Any suitable mechanism, such as the sticky plunger or pneumatic feeder (none shown) may be employed to feed the molten glass through orifice F in a continuously flowing but pulsating stream to produce a series of regularly recurrent enlarged sections therein which are connected together by portions of reduced area.

The shear mechanism 10 is mounted below the forehearth 11 and is preferably of such construction as to effect severance of the stream S at the points of reduced cross sections by a concurrent transverse and axial movement of the cutting elements to avoid interrupting or retarding the free downward flow of the material and prevent any piling up of the molten glass on the shear blades.

The shear mechanism 10 is supported as a whole on a frame or base plate 12, that is provided with vertically disposed side plates 13 whose upper ends are journaled on a hollow mandrel 14 which in turn is supported on brackets 15 on upright rods or columns 16 which also support the forehearth 11 on the main glass melting tank or furnace (not shown).

The side plates 13 are preferably connected to the frame 12 at a point to the right of a vertical plane through the mandrel 14 and the weight of the mechanism 10 on the frame is so distributed that the frame has a tendency to turn in a clockwise direction and raise that portion of the frame to the left of the mandrel 14 toward the orifice F, the purpose of this construction will be hereinafter more fully explained.

The shear mechanism 10 comprises a pair of opposed shear blades 17—17' of either the straight edge form or the usual "cat's eye" type which are mounted on cross-bars 18—18' whose ends are rigidly secured in the upper terminals of an opposed pair of arms 19—19'. The lower ends of both sets of arms 19—19' are coaxially journaled on stub shafts 20—20 that are rigidly supported in diametrically opposed portions 21—21 of an annular sleeve 22 which is rotatably mounted on a ball race 23 positioned between the sleeve and an inner cylindrical member 24 that is secured to the base plate 12. The shear blades 17—17' are normally held in their open positions by tension springs 25—25' which are attached at their upper ends to the arms 19—19' and are connected at their lower ends to the sleeve 22 when in their open position, the outer portion of the blades 17—17' are received in segmental trough-shaped boxes 26—26, one of which is supported on a cross-head 27 that extends between the brackets 15—15 and the other of which is supported on a bracket 28 that is attached to the frame of the forehearth 11. These boxes 26—26 may be filled with any suitable liquid such as oil which will serve both as a lubricant and a cooling medium for the cutting elements.

Figure 5:
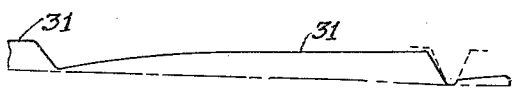
Fig. 5 is a projection of the cam surfaces employed in closing the shear blades.

The two cooperating pairs of shear blade arms 19—19 and 19'—19' which are pivotally mounted on the common stub shafts 20—20 are respectively connected at their lower or inner ends by curved cross-heads 29—29' of T-shaped cross section and each of these cross-heads is provided with a depending finger 30—30' which rides on a corresponding cam face 31—31' that are formed on the inner surface of the stationary annular member 24 so that as the sleeve 22 is rotated, the fingers 30—30' will ride over these cam surfaces and turn the connected arms 19—19 and 19'—19' about their pivot supports 20—20 to thereby first move the blades to their closed or severing position and then allow them to be returned to their open position by the springs 25—25'. The developed form or contour of the cam surfaces 31—31' is illustrated in Fig. 5.

In order to rotate the sleeve 22 for the purpose of actuating the shear blades as just described, a collar 33 is secured to the outer surface of the sleeve 22 and is provided with a beveled gear 34 which is engaged with a pinion 35 on the end of a shaft 36. The shaft 36 is journaled in a bearing 37 carried on the frame 12 and is intermittently driven to periodically rotate the sleeve 22 by friction clutch assembly 38—39, one element (38) of which is slidably keyed on the shaft 36 while the other element (39) is secured to the end of the drive shaft 40 of a suitable variable speed motor M which is also secured to the frame 12.

The element 38 of the clutch is moved toward and away from the element 39 to engage and disengage, respectively, the clutch by a bell crank 41 which is pivotally mounted to the frame 12 and has its upper end thereof coupled to the clutch element 38 by the usual collar connection. The other end of this lever is flexibly coupled to the lower end of a metallic bellows 42 and is also engaged by a spring 43 which is mounted in a recess 44 formed in the frame 12. The bellows 42 is normally held in its expanded position to disengage the clutch elements 38 and 39 by compressed air which is admitted into the bellows through a passageway 45 in the bearing block 37 that is connected by pipe 46 to a cylinder 47 of the timer valve assembly. The timer valve assembly is supplied with air through a pipe 48 that connects the cylinder 47 with the hollow mandrel 14 which, in turn, is connected at one end to a pipe 49 leading to a suitable source of motive fluid, such as compressed air.

Figure 4:
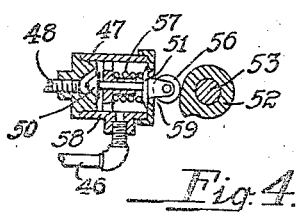
Fig. 4 is an enlarged sectional view illustrating the valve controlling the operation of the shear mechanism.

The detailed construction of the timer valve 47 which serves to periodically engage elements 38 and 39 of the clutch is shown in detail in Fig. 4. It comprises a double headed valve element 50—51 which is adapted to be moved in one direction to seat the head 50 and shut off the supply of air delivered through the pipes 48 and 46 to the bellows 42 and at the same time unseat the head 51 and thus connect the bellows to atmosphere. The valve element 50—51 is moved to seat the valve 50 by a cam 52 which is keyed to a continuously revolving cam shaft 53 which is connected through worm and gear elements 54—55, to the motor shaft 40. As the shaft 53 rotates, the cam 52 engages the roller 56 on the valve head 51 and moves the head 50 into position to close the pipe 48. The valves 50—51 are adapted to be moved in the reverse direction to seat the head 51 and unseat the head 50 by a spring 57 which is interposed between a ported partition 58 in the cylinder 47 and the valve head 51. As a result of this construction it is seen that the periodic engagement of the raised portion of the cam 52 with the roller 56 momentarily closes the connection between the compressed air line 48 and the pipe 46 and simultaneously opens the vent port 59 in the cylinder 47 whereby the delivery of air to the bellows is shut off and the interior of the bellows is connected to atmosphere, permitting it to collapse. On the collapse of the bellows 42 the spring 43 rotates the bell crank 41 and moves the clutch element 38 into engagement with the clutch element 39. As soon as the clutch elements are engaged the sleeves 33—22 start to turn and the fingers 30—30' immediately start to ride up to the cam surfaces 31—31' and advance the shear blades 17—17' toward each other.

To prevent the clutch elements 38 and 39 from being moved apart or disengaged until the sleeves 33—22 have been turned through one complete revolution and the shear blades 17—17' have thus been closed and reopened, an auxiliary valve 65 is interposed in the passageway 45 for automatically closing the passageway at the start of rotation of the sleeves 33—22 and keeping it closed until this movement of the sleeves is completed. This action is effected by means of an angularly adjustable cam 66 (Fig. 3) which is secured to the rotatable sleeve 33 in such position that when the sleeve 33 is stationary—i. e., when the clutch elements 38, 39 are disengaged—the valve 65 is held in its open position by the engagement of the outer end of valve stem 67 with the raised portion of this cam 66. However, as soon as the sleeves 33—22 start to rotate the cam 66 is moved out of contact with the valve stem 67 and the valve 65 is closed by a "backing up" spring 68 and it remains closed until the sleeve 33 has nearly completed its revolution at which time the beveled end 69 of the cam 66 again engages the valve stem 67 and moves the valve 65 to its opened position, thus reconnecting the bellows 42 with the cylinder 47. Since the valve 50 is only momentarily closed by the cam 52 compressed air is immediately admitted (the valve 65 being now unseated) to the bellows 42 which are then expanded to return the bell crank 41 to its initial position (shown in Fig. 1) and thus disengage clutch elements 38—39. To stop the rotation of the sleeve 33 as soon as the clutch elements 38—39 are disengaged, the slidable element 38 of the clutch is adapted to engage with a fixed collar 70 on the shaft bearing box 37, thereby applying a brake to the shaft 36 and bringing it to rest in such position that the fingers 30—30' drop into the depressed portions of the cam faces 31—31' (see Fig. 5) and permit the shear blades to be retracted by the springs 25—25'.

In order to obtain a combined axial and transverse movement of the shear blades 17—17' during the severing operation I have provided a roller 71 which is mounted on a stub shaft 72 that is carried by the crosshead 27 and which bears against the side of an eccentric hub 73 on the gear sleeve 33. The frame 12 as heretofore mentioned, has a tendency to swing in a clockwise direction and move the shear blades 17—17' toward the orifice F and the eccentric hub 73 out of contact with the roller 71. This movement of the frame in a clockwise direction is resisted by a tension spring 74 which is attached to the bottom of the forehearth and to the top of the frame 12. To regulate the tension of the spring 74 the lower end thereof is secured to a threaded eyebolt 75 which extends through a bracket 76 on the frame. A nut 77 is provided for moving the bolt 75 relative to the bracket, consequently, when the connected sleeves 33—32 are rotated, the frame 12 is rocked on its mandrel support 14 first by the engagement of the eccentric hub 73 with the fixed guide roller 71 to raise the shear blades 17 and then by the action of the spring 74 to lower the shear blades and return the frame to its original position. The eccentric hub 73 is so shaped and so positioned in relation to the cam surfaces 31—31' that as the sleeves 33—22 revolve, the outer end of the frame 12 will be moved upwardly towards the bottom of the forehearth and will reach its highest point at the time the blades are just starting to enter the stream of glass. As the movement of the blades 17—17' toward full cutting position continues the swinging movement of the frame is reversed and the outer end of the frame 12 moves downwardly to its original position so that blades move with the stream S during the severing operation. The cam surfaces 31—31' are also preferably so shaped that the time of contact of the cutting elements with the stream is such that the shears 17—17' will revolve through at least one-half of a revolution, that is to say, the movement of the shear blades 17—17' from the full line position to the dotted line position of Fig. 1 will be effected during the first half of the revolution of the sleeves 33—22 and the cutting or severance of the glass will be effected during the last half of this movement.

The shear mechanism is preferably operated in timed relation with the means employed for forcing the glass in the forehearth 11 through the orifice F so that the stream will be severed at the points of reduced cross section between the enlarged sections produced by the periodic application of the expelling pressure on the glass above the orifice by the feeding means.

To recapitulate, when the cam 52 engages the roller 56 thereby closing the valve 50 and opening the valve 51, the bellows 42 will collapse and the spring 43 will then rotate the bell crank 41 to engage the clutch elements 38 and 39. On this engagement of the clutch elements, the sleeves 33—22 will begin to move. As the sleeves 33—22 start to rotate, the fingers 30—30' ride up on the cam faces 31—31' and advance the shear blades 17—17' toward each other. At the same time the engagement of the eccentric sleeve 73 with the roller 71 causes the frame carrying the shear mechanism to swing about the mandrel 14 and to lift the advancing blades 17—17' toward the bottom of the forehearth 11. As the blades start to enter the stream the frame carrying the shear mechanism is swung downwardly (by the action of the spring 74) so that the blades travel with the stream during the time they are in engagement therewith. The cam faces 31—31' are so shaped that the final closing movement of the shears and during which time the blades are in contact with the glass requires at least one-half of a complete revolution of the sleeve 33. As soon as the cut has been completed, the fingers 30—30' drop into the pockets in the cam faces 31—31' and permit the shear blades 17—17' to be quickly retracted by springs 25—25' and returned to their open position. When the sleeves 33—22 have been turned through approximately one complete revolution and just before shear blades 17—17' are fully retracted as above stated, the cam 66 engages the valve stem 67 and unseats or opens the valve 65, thereby readmitting compressed air to the bellows 42 and disengaging clutch elements 38—39 to stop rotation of the shaft 36 and the sleeve 33. When the next gob or mold charge is to be severed from the stream this cycle of operation is again repeated.

Figures 6, 7, 8:
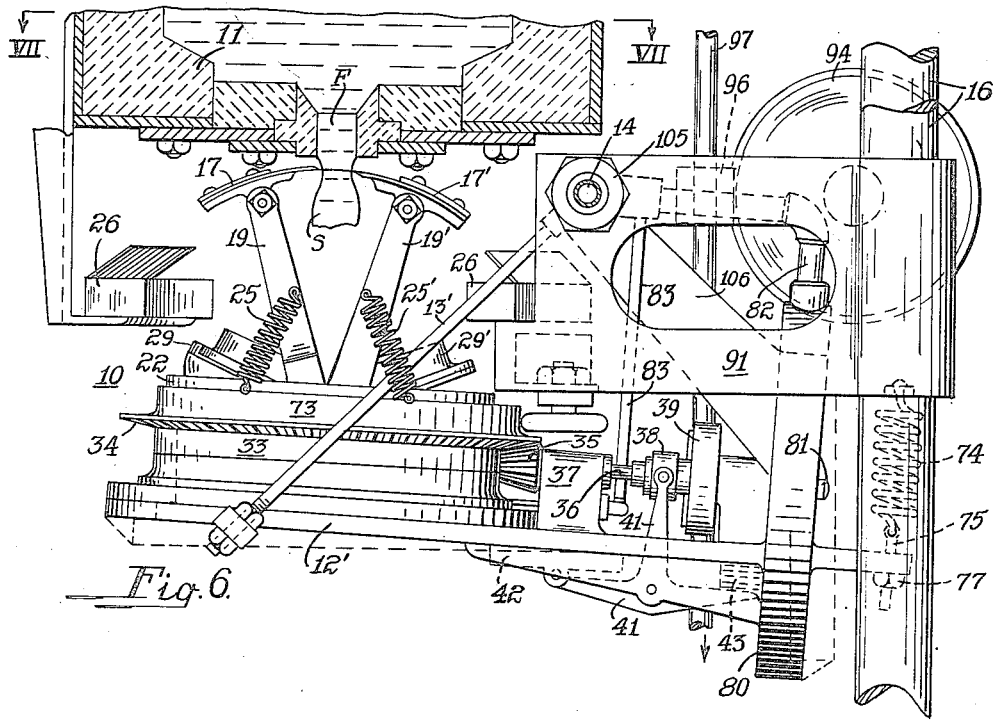
Fig. 6 is a view in elevation of the shear mechanism illustrating the position of the parts at the time the blades start the severing action and also illustrate another means for rotating the shear blades.
Fig. 7 is a reduced horizontal section taken on line VII—VII of Fig. 6.
Fig. 8 is an enlarged sectional view illustrating the valve controlling the operation of the shear driving means shown in Fig. 6.

In Figs. 6 to 8, inclusive, I have illustrated another means for rotating the sleeves 33—22 to operate the shear blades 17—17'. In this modification the motor M is replaced by a turbine rotor 80 which is secured to a shaft 81 that carries the central element 39. The rotor 80 is continuously driven by fluid pressure introduced into the rotor chamber through a pipe 82 leading from the hollow mandrel 14. The rotor 80 and the shear mechanism are supported on a frame 12' which is connected by side rods 13' to a sleeve 105 that is journaled on the mandrel 14 and which has arms 106 extending therefrom that support the rotor chamber 80. The mandrel 14 is journaled in a support 91 which is secured to the side posts 16. The clutch elements 38—39 are normally held in released or disengaged position by bellows 42 which is supplied with air through pipe 83 that in this construction communicates with a port 84 in the side of the hollow mandrel 14. In order to disengage the clutch elements 38—39 to rotate the sleeves 33—22 and close shear blades 17—17', a valve 85 is positioned in the hollow mandrel 14 and is adapted to be momentarily closed at regular intervals to shut off the supply of air to the bellows 42. The valve 85 is normally held in its open or unseated position by the pressure of the air in the mandrel 14 and is provided with a stem 86 which extends beyond the end of the mandrel and carries a disc valve 87 for closing an atmospheric vent port 88 in the end of the mandrel 14, opposite from that connected to the compressed air pipe 49.

The projecting end of the valve stem 86 is connected to one end of lever 89 which is centrally pivoted on a bracket 90 that forms a part of the mandrel support 91. The other end of the lever 89 carries a roller 92 which is engaged by a face cam 93 that is carried by a worm wheel 94. The connected elements 93—94 are rotatably mounted on a stud bolt 95 secured to the mandrel support 91 and are continuously driven through a worm 96 on a shaft 97 which is continuously driven by a suitable variable speed motor (not shown).

The stream of glass issuing through the orifice is severed into mold charges in timed relation to the action of the feeder mechanism (not shown) contained in the forehearth 11 and when the apparatus is in operation, the continuously revolving face cam 93 is adjusted to close the valve 85 at or about the time when the glass feeding mechanism has exerted its maximum amount of pressure on the glass over the orifice F. The closing of the valve 85 concurrently opens disc valve 87 and permits air in the bellows 42 to escape to atmosphere. When this occurs, the bellows 42 collapses and the spring 43 rocks the lever 41 and moves the clutch element 38 into engagement with clutch element 39 on the rotor shaft 81. This engagement of the clutch elements rotates the sleeves 33—22 and advances the shear blades 17—17' toward each other and, at the same time, the eccentric sleeve 73 bearing against the roller 71 moves the blades toward the orifice so that they reach their highest position as they enter the stream S. Further rotation of the sleeves 33—22 completely closes the shear blades and permits the frame 12' to drop so that the blades travel with the stream during the severing operation.

After the cut has been made the rotation of the sleeves 33—22 is stopped by opening the valve 65 which admits compressed air into and expands the bellows 42.

From the foregoing description it is apparent that I have provided shear mechanism for severing a continuously flowing stream of glass in such a way as to avoid any piling up of the material on the shear blades since the shear blades travel downwardly with the stream while they are in engagement with the stream and since the blades are rotating about the stream as an axis during the severing operation, each element of the cutting blades follows a three dimensional spiral path as they pass through the glass. The downward movement of the blades through the stream during the cutting operation also tends to assist the oncoming flow and to accelerate delivery of the severed gob to the mold of the forming machine. The rotation and movement of the blades around the axis of the stream also avoids localized lateral pinching and flattening out of the soft plastic material and produces, in consequence, a smoother and more symmetrical cut and severance and a more rounded and less distorted or deformed contour of the severed ends.

I also desire it to be understood that I have designed various other apparatus and procedures for severing mold charges from a continuously flowing but pulsating stream of molten glass, and that such apparatus and procedures form the subject matter of and are claimed in copending applications for Letters Patent and structurally and functionally distinguish from the subject matter herein claimed.

While I have illustrated one modification of my improved apparatus for severing molten glass, it is understood that various other apparatus may be used without departing from the spirit of my invention or the scope of the appended claims.

What I claim as new and desire to secure by Letters Patent is:

1. A shear mechanism comprising a pair of opposed shear blades, a rotatable member supporting said blades, means for intermittently rotating said member through one complete revolution, means for oscillating said member during each revolution thereof to raise and lower said blades, and means adapted to move said blades toward and into cutting engagement with each other as said member oscillates to raise said blades and to move said blades away from each other as the member oscillates to lower said blades.

2. A shear mechanism comprising a pivoted frame, shear blades rotatably mounted on said frame, means responsive to the rotation of said blades for turning said frame in one direction to raise said blades, means for closing said blades, and means for returning said frame to its initial position.

3. An apparatus of the character described, comprising a pivoted frame, shear blades rotatably mounted on said frame, a rotating element, means for periodically connecting said blades to said rotating element, means responsive to the rotation of said blades for turning said frame about its pivot, and means responsive to the rotation of said blades for moving the blades into cutting engagement with each other.

4. A shear mechanism comprising a pair of shear blades, a sleeve supporting said blades, means for periodically rotating said sleeve through one revolution, means for oscillating said sleeve to raise and lower said blades during each revolution of said sleeve, and means for moving said blades from a retracted position to a cutting position and returning the same to such retracted position as said blades are raised and lowered during each revolution of said sleeve.

5. A shear mechanism comprising a pair of shear blades, a rotatable sleeve on which said blades are journaled, a support for said sleeve, means for rotating said sleeve, means controlled by the rotation of said sleeve for swinging said support in opposite directions to raise and lower said blades, and means controlled by said sleeve for moving said blades from a retracted position to a cutting position and back to such retracted position on each revolution thereof.

6. A shear mechanism comprising a pair of shear blades, a rotatable blade carrying member, a support for said member, means for periodically rotating said member through one revolution, means associated with said member for swinging said support in opposite directions on the rotation thereof, and means responsive to the rotation of said member through a complete revolution for moving said blades from a retracted position to a closed position and back to such retracted position.

7. A shear mechanism comprising a pair of shear blades, a rotatable member on which said blades are mounted, a rotating element, means for periodically connecting said rotating element to said member to turn the blades through one revolution and means responsive to the rotation of said member for moving said blades from a retracted to a cutting position and returning them to such retracted position during each revolution thereof.

8. A shear mechanism comprising a pair of shear blades, arms connected to each of said shear blades, a rotatable sleeve to which the ends of said arms are journaled, means for periodically rotating said sleeve, means responsive to the rotation of said sleeve for moving said blades from a retracted position to a closed position and back to such retracted position on each revolution thereof, and means for receiving said shear blades when in retracted position to cool the same.

9. A shear mechanism comprising a pair of shear blades, arms connected to each of said blades, a rotatable sleeve on which said arms are journaled, cam followers carried by said arms, cam surfaces over which said followers are adapted to ride on rotation of said sleeve, means for yieldably holding said followers against said cam surfaces, and means for rotating said sleeve to move said followers over said cam surfaces and close and open said blades.

10. A shear mechanism comprising a pair of shear blades, arms connected to said blades, a rotatable sleeve on which said arms are journaled, cam followers secured to said arms, cam surfaces over which said followers are adapted to ride on rotation of said sleeve, means for rotating said sleeve to move said cam followers over said surfaces and close and open said blades, and means responsive to the rotation of said sleeve for raising and lowering said blades.

11. A shear mechanism comprising a pair of shear blades, an arm connected to each of said blades, a rotatable sleeve on which said arms are journaled, a cam follower secured to each arm, cam surfaces over which said followers are adapted to ride on rotation of said sleeve, means for yieldably holding said followers against said cam surfaces, means for rotating said sleeve to move said cam followers over said surfaces and actuate said blades, and means responsive to the rotation of said sleeve for raising and lowering said blades.

12. A shear mechanism comprising a pair of opposed shear blades, an arm connected to each of said blades, a rotatable sleeve on which said arms are journaled, a cam follower secured to each arm, a cam surface over which each said cam follower rides on rotation of said sleeve, a support for said sleeve, an eccentric hub secured to said sleeve, means for rotating said sleeve to move said cam follower over said cam surfaces and close and open said blades, and means cooperating with said eccentric hub on the rotation of said sleeve for swinging said support and raising and lowering said blades.

13. A shear mechanism comprising a pair of shear blades, a rotatable sleeve on which said blades are journaled, means responsive to the rotation of said sleeve for actuating said blades to move them from a retracted to a cutting position and back to such retracted position, a rotating element, a clutch for connecting said sleeve to said element, and means for periodically engaging said clutch.

14. A shear mechanism comprising a pair of shear blades, a rotatable sleeve on which said blades are journaled, means for closing and opening said blades on rotation of said sleeve, a rotating element, a clutch for connecting said sleeve to said element, means for periodically engaging said clutch, and means for disengaging said clutch and bringing said sleeve to rest after it has been turned through one revolution.

15. A shear mechanism comprising a pair of shear blades, a supporting member for each blade, a rotatable sleeve on which said supporting members are journaled on a common mounting, a cam follower secured to each of said supporting members, a cam surface over which each said cam follower rides on rotation of said sleeve, a swinging support for said sleeve and cam surfaces, means for rotating said sleeve, and means responsive to the rotation of said sleeve for swinging said support in opposite directions to raise and lower said blades.

16. A shear mechanism comprising a pair of opposed shear blades, a supporting member for each blade, a cam follower secured to each supporting member, cam surfaces on which said cam followers ride, a rotatable sleeve on which said supporting members are journaled, a swinging support for said sleeve, means for rotating said sleeve and means for swinging said support to raise and lower said blades, said last-mentioned means including an eccentric hub on said sleeve and an independently mounted roller engaging said hub.

17. A shear mechanism comprising a pair of shear blades, a supporting member for each blade, a rotatable sleeve on which said supporting members are journaled, a cam follower secured to each of said supporting members, cam surfaces on which said cam followers ride, a swinging support for said sleeve and cam surfaces, means for periodically rotating said sleeve, and means for swinging said support in opposite directions to raise and lower said blades, said last-mentioned means including an eccentric hub on said sleeve and an independently mounted roller engaging said hub, and means for holding said hub in engagement with said roller during rotation of said sleeve.

18. In combination with a container for molten glass having a submerged orifice, of mechanism for severing the glass stream issuing through said orifice comprising a pair of shear blades, a rotatable sleeve carrying said blades, a swinging support for said sleeve, means for periodically rotating said sleeve, means responsive to the rotation of said sleeve on each revolution thereof for moving said blades from a retracted position to a cutting position and back to such retracted position, means adapted to swing said support toward said orifice and raise said blades as they approach their cutting position, and means adapted to rock said support away from said orifice as the blades cross each other in cutting position whereby the blades travel with the stream during the severing operation.

19. A shear mechanism comprising a pair of opposed shear blades, a rotatable member supporting said blades, means for periodically turning said member through one revolution, means for swinging said member first in one direction and then in the opposite direction to raise said blades during a portion of each revolution of said member and to lower said blades during the remaining portion of such revolution of such member and means controlled by the turning of said member for moving said blades toward each other as said blades are raised and for moving said blades away from each other as said blades are lowered.

20. A shear mechanism comprising a pair of shear blades, a rotatable blade carrying member, a support for said member, means for periodically rotating said member, means responsive to the rotation of said member for swinging said support in opposite directions in a vertical plane to raise and lower said blades, and means for moving said blades from a retracted position to a closed position and back to said retracted position during each period of rotation of said member.

21. A shear mechanism comprising a pair of opposed shear blades, means for rotating said blades, means for raising and lowering said blades during the rotation thereof, means for closing said blades while said blades are in their raised position, means for retracting said blades while said blades are being lowered, and means for cooling said blades while in retracted position.

22. A shear mechanism comprising a pivoted support, a sleeve rotatably mounted on said support, a pair of shear blades carried by said sleeve, an eccentric hub mounted on said sleeve, a fixed roller engaging said hub, means for closing and opening said blades on rotation of said sleeve, and means for periodically rotating said sleeve and hub, said roller and hub being arranged to impart a swinging movement to said sleeve during the rotation thereof.

23. A shear mechanism comprising a rotatable sleeve, a pair of shear blades carried by said sleeve, means for moving said blades from a retracted position to a closed position and back to such retracted position during the rotation of said sleeve, and means for periodically rotating said sleeve including a driven element, a clutch for connecting said driven element to said sleeve and a bellows for periodically actuating said clutch.

24. A shear mechanism comprising a rotatable sleeve, a pair of shear blades carried by said sleeve, means operable as said sleeve is rotated for moving the blades from a retracted position to a closed position and back to such retracted position and means for periodically rotating said sleeve including a driven element, a clutch for connecting said element to said sleeve, a bellows for engaging and disengaging said clutch, and means for periodically energizing and deenergizing said bellows.

25. A shear mechanism comprising a rotatable sleeve, a pair of shear blades carried by said sleeve, means responsive to rotation of said sleeve for moving said blades from a retracted position to a closed position and back to such retracted position, means for swinging said sleeve in a vertical plane to raise and lower the blades carried thereby, and means for periodically rotating said sleeve including a driven shaft and a clutch for periodically connecting said shaft to said sleeve.

FRANK L. O. WADSWORTH.